July 29, 1958 M. A. CRAUSMAN ET AL 2,845,088
RELIEF VALVE
Filed June 10, 1953
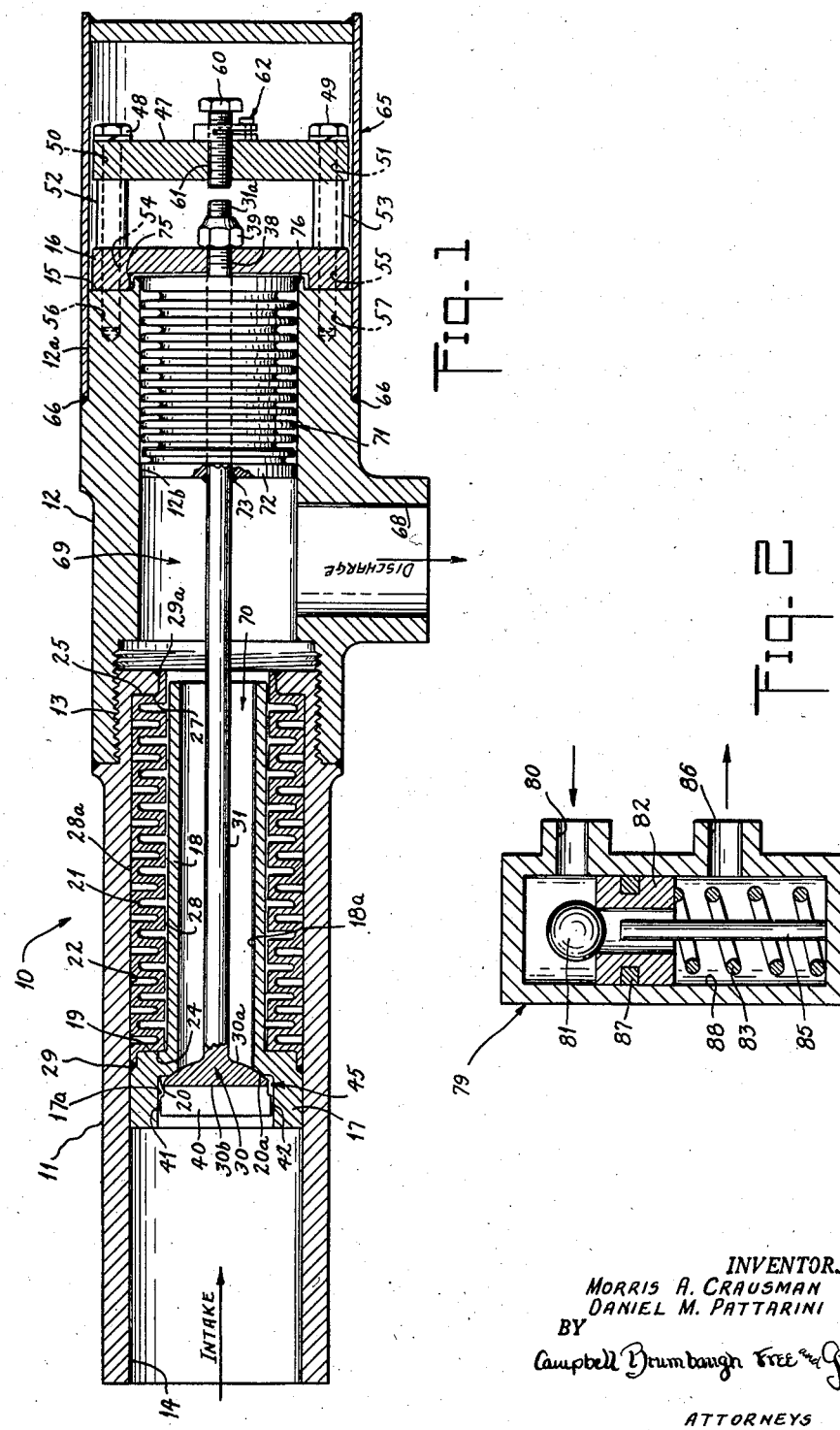
INVENTORS.
MORRIS A. CRAUSMAN
DANIEL M. PATTARINI
BY
Campbell Brumbaugh Free & Graves
ATTORNEYS

United States Patent Office 2,845,088
Patented July 29, 1958

2,845,088

RELIEF VALVE

Morris A. Crausman, Brooklyn, and Daniel M. Pattarini, Glen Cove, N. Y., assignors to Target Rock Corporation, Huntington, N. Y., a corporation of New York Application June 10, 1953, Serial No. 360,748

8 Claims. (Cl. 137—508)

This invention relates to a novel relief valve and more particularly it relates to an inverted type relief valve for discharging excessive pressure from a pressure system.

It has been found that conventional type inverted relief valves have several inherent disadvantages which make them unsatisfactory for certain industrial purposes. For example, conventional inverted type relief valves utilize a piston seal to prevent seepage past a sliding valve seat, and it has been found that both the seal and the valve seat tend to wear out rapidly and therefore substantially limit the useful life of the valve. Also, it has been found that despite the piston seal, there is some seepage past the valve seat. Further, there is a noticeable lag in the closing of the valve due to the friction between the piston seal and the housing. In addition, varying back pressures at the discharge side of the old type inverted valve interfere with its normal operation.

Accordingly, it is an object of this invention to provide an inexpensive and dependable inverted type relief valve in which there is no pressure seepage past the valve seat.

Another object of this invention is to provide a relief valve of the above character in which there is substantially no friction between the valve seat and the valve housing and in which the valve is promptly reseated after normal pressure in the system has been re-established.

Still another object of this invention is to provide a relief valve of the above character in which the operation of the valve is not impeded by the fluctuation of back pressures at its discharge end.

These and other objects of the invention are attained by a novel valve construction which utilizes a machined spring bellows or a combination of spring and bellows to serve the dual function of preventing pressure leakage past the valve seat and assisting in the prompt reseating of the valve. Also, a pressure counterbalancing means is provided at the discharge side of the valve to eliminate the interference with normal valve operation caused by varying back pressures.

For a better understanding of the present invention reference may be had to the accompanying drawing in which:

Figure 1 is a view in longitudinal section showing a typical valve constructed in accordance with the invention; and Figure 2 is a view in longitudinal section of a conventional inverted relief valve.

With reference to the form of the invention disclosed in Figure 1, a cylindrical housing 10 is formed of two housing members 11 and 12; the former having a threaded portion 13 which is screwed into member 12. The left-hand or intake end 14 of the housing 10 is open, and the right-hand or discharge end 15 is closed by a circular end plate 16.

A cylindrical valve seat 17 is slidably received within the housing 10 near its intake end 14. A flange or skirt 18, formed integral with the discharge side 19 of the valve seat 17, extends longitudinally within the housing 10. It will be seen that the inner wall 17a of valve seat 17 is of larger diameter than the inner wall 18a of the skirt 18, and thus, a recessed, circular shoulder 20 is formed within the valve seat 17.

A machined spring bellows 21 is concentrically mounted about the skirt 18 of the valve seat 17, within the housing 10. The opposite ends 24 and 25 of the spring bellows 21 are positioned between the discharge side 19 of the valve seat 17 and an inwardly extending shoulder 27, formed about the threaded end 13 of the housing member 11. The spring bellows 21 normally urges the valve seat 17 towards the intake end 14 of the housing 10.

By providing suitable tolerances between the inner and outer sides 28 and 28a of the machined bellows 21, and the inner wall 22 of the housing member 11 and the skirt 18, respectively, there is no friction between these relatively moving parts. Also, there is no problem of seepage past the bellows 21, because the opposite ends 24 and 25 thereof are welded or otherwise secured as indicated at 29 and 29a, to the sliding valve seat 17 and the collar 27, respectively.

A valve 30, having a relatively long valve stem 31, is received within the opening 17a of the valve seat 17. The discharge side 30a of the valve 30 is normally maintained in engagement with the bevelled corner 20a of the recessed shoulder 20 within the valve seat 17. The valve stem 31 extends through the valve seat skirt 18 and is slidably received through an opening 38 in the end plate 16 of the housing 10. A lock nut 39 is screwed on the threaded end 31a of the valve stem 31. By its engagement with the end plate 16, the nut 39 serves to limit the movement of the valve 30 towards the intake end 14 of the housing, and also to adjust the initial valve reseating tension exerted by the machined bellows 21.

A guide member 40, having shoulders 41 and 42 formed at its opposite ends, is welded or otherwise secured to the intake side 30b of the valve 30. The shoulders 41 and 42 slidably engage the inner wall 17a of the valve seat 17 and thereby insures the proper reseating of the valve 30. In this connection, it will be seen that the diameter of the valve 30 is substantially less than the diameter of the opening 17a in the valve seat 17. Thus, adequate space, indicated at 45, is provided for the unimpeded pressure flow past the valve, when the latter is unseated.

A partition member 47 is supported in parallel relationship beyond the end plate 16, by bolts 48 and 49. The bolts 48 and 49 extend through openings 50 and 51 in the partition member 47, spacer rings 52 and 53, openings 54 and 55 in end plate 16, respectively, and are threaded into openings 56 and 57 in the adjacent end 15 of the housing member 12. It will be noted that the bolts 48 and 49 also serve to secure the end plate 16 to the housing member 12.

A set screw 60, which is threaded through an opening 61 in the partition member 47, may be positioned a predetermined distance from the end 31a of the valve stem 31. The set screw 60 serves as an adjustable stop to limit the movement of the valve 30 towards the discharge end of the housing 10. A locking member indicated at 62 may be provided to firmly secure the screw 60 in the desired position. The set screw and partition assembly are enclosed by a cap 65 which receives a portion 12a of the housing member 12, and is welded or otherwise secured thereto, as indicated by numeral 66.

A discharge port 68 formed in the side of the housing member 12, communicates with a pressure chamber 69 disposed therein. The chamber 69 communicates at one end with the open end 70 of the valve seat skirt 18. The opposite or right-hand end of the chamber 69 is enclosed by bellows 71 having a left-hand end closure 72. Sufficient tolerances are provided between the bellows 71 and end closure 72, and the inner wall 12b of the housing member 12, to prevent any friction when the parts are moved. The bellows 71 is concentrically disposed about the valve stem 31 and its left-hand end closure 72 is welded or otherwise secured thereto as indicated by numeral 73. The right-hand open end of the bellows 71 is welded or otherwise secured to a circumferential shoulder 75 formed about the end 15 of housing member 12, as indicated at 76.

Thus, it will be seen that the bellows 71 serves as a pressure seal for the right-hand end 15 of the housing member 12. Further, it will be appreciated that the pressure reacting surface of the end closure 72 exactly balances the area of the discharge side 30a of the valve 30 plus the area on the discharge side 24 of the moving valve seat 17. As a result the effects of fluctuations in the back pressure at the discharge port 68 are balanced, and in no way impede the operation of the valve or disturb the initial valve seating tension.

To illustrate the operation of this new type valve, it will be presumed that the valve parts are in substantially the position shown in Figure 1. When the pressure at the intake port 14 increases, the valve seat 17 and valve 30 are urged together as a piston towards the discharge port 68, against the tension of the machined bellows 21 and the bellows 71. As the pressure increases, the end 31a of the valve stem 31 comes in contact with the set screw 60, and is thereby prevented from moving further in this direction. The pressure then increases until it is sufficient to move the valve seat 17 further towards the discharge port 68. As a result, the bevelled corner 20a of the valve seat 17 is moved out of engagement with the valve 30, thus permitting pressure to flow out through the discharge port 68. In this connection, it will be appreciated that the set screw 60 may be adjusted to provide for the opening of the valve 30 when a predetermined pressure is reached at the intake port 14.

When the pressure at the intake port 14 has dropped to a predetermined value, the spring tension provided by the bellows 71 urges the valve stem 31 and valve 30 towards the intake port 14 and at the same time the machined spring bellows 21 moves the valve seat 17 back into engagement with the valve 30. In this connection it will be understood of course that additional spring means may be utilized to assist the bellows 71 in moving the valve 30 and valve stem 31.

In order to further illustrate the novel features of this new valve, a simplified disclosure of a conventional type inverted relief valve 79 is shown in Figure 2. When pressure is admitted through intake port 80, a ball 81 and a sliding valve seat 82 are urged as a piston away therefrom, against the tension of a valve seat spring 83. As the pressure increases, the ball 81 eventually comes in contact with the abutment member 85 and thereby the ball 81 is raised out of engagement with the valve seat 82. As a result, pressure is permitted to flow out through the discharge port 86. A sealing ring 87 is utilized to prevent leakage past the valve seat 82. It will be appreciated that the sealing ring 87, which is usually made of hard rubber or the like, tends to wear out more rapidly than the other valve parts and thus the useful life of the valve is substantially reduced. In addition, because of the friction between the seal 87 and the inner housing wall 88 of valve 79, there has been found to be a noticeable lag in the reseating of the ball 81.

In the applicants' device this disadvantage is overcome by the utilization of a spring bellows in place of the piston ring type seal, the latter necessitating close tolerances which causes high friction. Also, it will be seen that in the conventional inverted relief valve an increase in spring tension does not increase the seating force between the valve and valve seat. In the applicants' valve the seating tension is substantially equal to the force exerted by the machined spring bellows 21.

Further, it will be noted that in the conventional inverted relief valve there is no means provided to insure a positive reseating of the ball 81. The rapidity and force with which the seat 82 contacts the ball 81 is solely a function of the speed with which the pressure returns to its normal value. In this respect, the operation of the conventional inverted relief valve is similar to an ordinary relief valve.

It is to be understood, of course, that the applicants' valve structure is susceptible to considerable modification, therefore, the form of the invention described above should be considered as illustrative and not as limiting the scope of the following claims.

We claim:

1. A relief valve for a fluid pressure system comprising a housing having intake and discharge ports, a valve seat member slidably mounted within said housing, and having an opening therein communicating with said discharge and intake ports, a valve member normally engaging the valve seat, thereby closing said opening in said valve seat member, said valve and valve seat members being movable in one direction by the fluid pressure, adjustable means for limiting the movement of said valve member in said one direction, the further movement of the valve seat member relative to the valve member producing separation therebetween, thereby opening said valve seat member opening, a spring bellows within said housing and engaging said valve seat member for urging said seat member in the opposite direction and for maintaining said seat member and housing in a pressure tight relationship, and spring means including a member slidably received within said housing and in communication with said discharge port, said slidable member being connected to the valve member, whereby the spring means urges said valve member in the opposite direction and for eliminating the effect of varying back pressures at the discharge port.

2. A relief valve as described in claim 1 wherein said spring means includes a spring bellows and an end closure at one end thereof which is slidably received within said housing and disposed on the opposite side of said discharge port in respect to said valve seat member.

3. A relief valve as described in claim 1 including guide means for maintaining said valve and valve seat members in axial alignment as said members are moved relative to each other.

4. A relief valve for a fluid pressure from a pressure system comprising a housing having intake and discharge ports, a valve seat slidably received within said housing having an opening therein communicating with said discharge and intake ports, a valve member normally engaging the valve seat, thereby closing said valve seat member opening, said valve and valve seat member being movable in one direction by the fluid pressure, an adjustable stop member for limiting the movement of said valve member in said one direction, the further movement of said valve seat member relative to the valve member producing separation therebetween, whereby said valve seat member opening is opened, a spring bellows slidably mounted within said housing and engaging the valve seat member, thereby serving to urge said valve seat member in the opposite direction and to maintain said seat member and housing in pressure tight relationship, and spring means connected to said valve member and in communication with said discharge port for urging said valve member in said opposite direction and for reducing the effect of varying back pressures at the discharge port.

5. A relief valve as described in claim 4 wherein said spring means includes a spring bellows and a bellows end closure disposed at one end thereof, said bellows end closure being slidably mounted in substantially pressure tight relationship within said housing and being disposed on an opposite side of said discharge port in respect to said valve seat member.

6. A relief valve as described in claim 4 wherein said spring means includes a spring bellows and a bellows end closure having a larger pressure contacting surface than the area described by the opening in said valve seat member, mounted on said bellows, said end closure being slidably received in substantially pressure tight relationship within said housing and disposed on the opposite side of said discharge port in respect to said valve seat member.

7. A relief valve for a fluid pressure system comprising a housing having intake and discharge ports, a valve assembly slidably mounted within said housing for controlling the flow of a fluid under pressure from said intake to said discharge ports, said valve assembly including a valve and a valve seat, said valve assembly being movable in one direction by the pressure of the fluid, yielding means for resisting the sliding movement of the valve assembly by the pressure of the fluid, stop means for producing relative displacement between the valve and valve seat when the valve assembly has moved a predetermined distance due to an increase in the fluid pressure, said relative displacement between the valve and the valve seat establishing communication between the intake and the discharge ports, and pressure reacting means in communication with the discharge port and connected to said valve assembly for minimizing and counterbalancing the effect of varying back pressures at said discharge port.

8. A relief valve as set forth in claim 7 wherein said yielding means comprises a spring bellows which is between said housing and said valve seat to produce an hermetic seal therebetween.

References Cited in the file of this patent
UNITED STATES PATENTS

| | | |
|---|---|---|
| 1,195,253 | Naslund | Aug. 22, 1916 |
| 1,608,618 | Richards | Nov. 30, 1926 |
| 1,999,698 | Kleckner | Apr. 30, 1935 |
| 2,472,049 | Schneck | May 31, 1949 |

FOREIGN PATENTS

| | | |
|---|---|---|
| 641,327 | Great Britain | Aug. 9, 1950 |